(12) United States Patent
Hiroyoshi

(10) Patent No.: US 7,359,185 B2
(45) Date of Patent: Apr. 15, 2008

(54) DOCKING DEVICE FOR PORTABLE COMPUTER AND DOCKING STRUCTURE

(75) Inventor: Koichi Hiroyoshi, Nagano (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 11/124,546

(22) Filed: May 6, 2005

(65) Prior Publication Data
US 2005/0248917 A1    Nov. 10, 2005

(30) Foreign Application Priority Data
May 7, 2004   (JP)   ............. P2004-139136

(51) Int. Cl.
*H05K 5/00*   (2006.01)
*H05K 7/00*   (2006.01)
(52) U.S. Cl. ............. 361/683; 361/680; 361/686; 312/223.3; 439/341
(58) Field of Classification Search ............ 361/680, 361/683–686; 439/341; 312/223.3
See application file for complete search history.

(56) References Cited

U.S. PATENT DOCUMENTS

| | | | | |
|---|---|---|---|---|
| 5,694,292 A | * | 12/1997 | Paulsel et al. | ............. 361/686 |
| 5,737,541 A | * | 4/1998 | Shimizu et al. | ............. 710/303 |
| 6,135,801 A | * | 10/2000 | Helot et al. | ................. 439/341 |
| 6,667,881 B2 | * | 12/2003 | Oross et al. | ................. 361/686 |
| 7,038,908 B2 | * | 5/2006 | Usui et al. | ................... 361/686 |
| 2003/0202323 A1 | * | 10/2003 | Maeda | ........................ 361/686 |
| 2003/0231465 A1 | * | 12/2003 | Weng | ......................... 361/686 |
| 2004/0120112 A1 | * | 6/2004 | Mullen et al. | ............. 361/686 |
| 2004/0145864 A1 | * | 7/2004 | Usui et al. | ................... 361/683 |
| 2005/0168937 A1 | * | 8/2005 | Yin et al. | .................... 361/686 |

* cited by examiner

*Primary Examiner*—Lisa Lea-Edmonds
*Assistant Examiner*—Anthony M Haughton
(74) *Attorney, Agent, or Firm*—Oblon, Spivak, McClelland, Maier & Neustadt, P.C.

(57) ABSTRACT

A docking device for a portable computer to be mechanically and electrically connected to the portable computer to expand the function of the portable computer includes a tray for placing the rear end of the portable computer thereon and a locking unit for locking the portable computer on the tray by manual operation, in which the tray includes a claw member to be mated with an incised portion formed on the back face of the portable computer, a bottom plate having a docking connector arranged thereon for electrically connecting to the portable computer, and a movable tray arranged on the bottom plate rotatably by a predetermined angle, and the movable tray has two recesses equivalent in shape to legs formed at the rear end of the portable computer and an opening for exposing the docking connector and the locking unit during docking.

7 Claims, 10 Drawing Sheets

TRAY

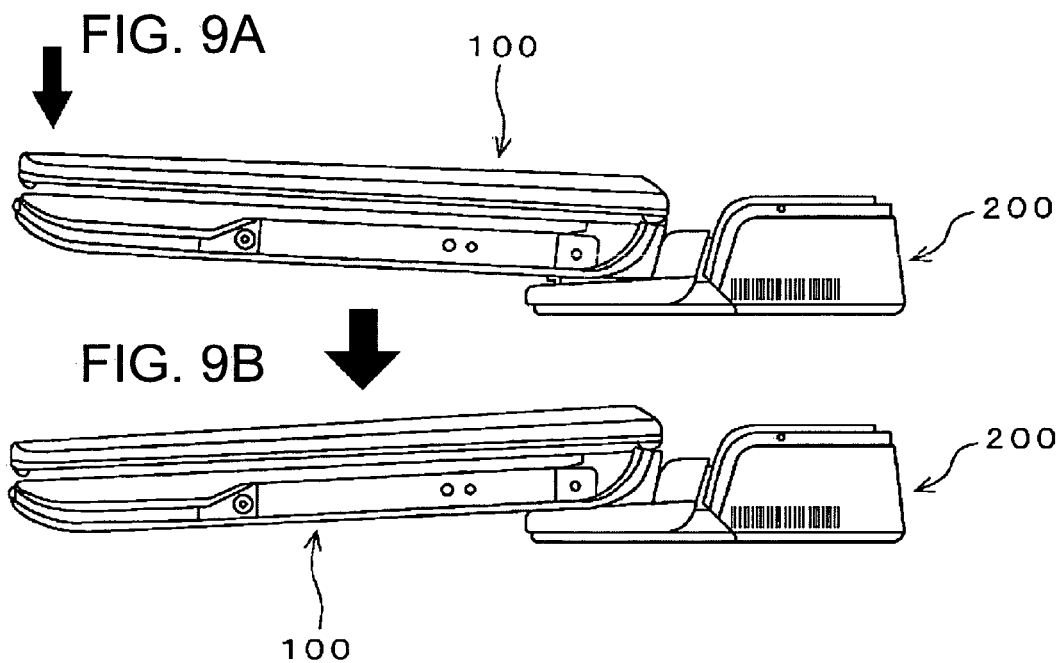
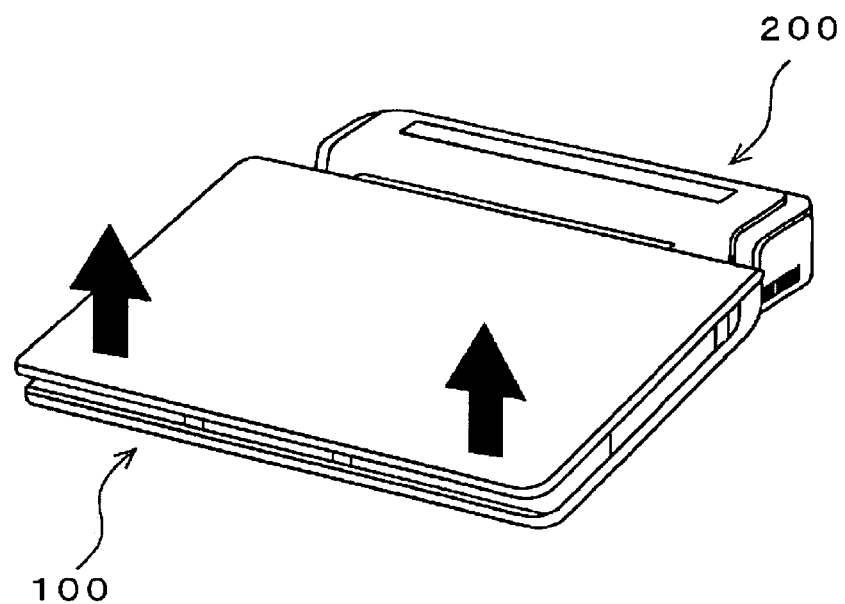

DOCKING DEVICE FOR PORTABLE COMPUTER AND DOCKING STRUCTURE

CROSS REFERENCES TO RELATED APPLICATIONS

The present invention contains subject matter related to Japanese Patent Application JP 2004-139136 filed in the Japanese Patent Office on May 7, 2004, the entire contents of which are incorporated herein by reference.

BACKGROUND OF THE INVENTION

1. Field of the Invention

The present invention relates to a docking device for portable computers and a docking structure mechanically and electrically connected to a portable computer so as to expand the function of the portable computer. In detail, the docking device includes a tray for placing the rear end of the portable computer thereon and a locking unit for locking the portable computer on the tray by manual operation, in which the tray includes a claw member to be mated with an incised portion formed on the back face of the portable computer, a bottom plate having a docking connector arranged thereon for electrically connecting to the portable computer, and a movable tray arranged on the bottom plate rotatably by a predetermined angle. The movable tray includes two recesses equivalent in shape to legs formed at the rear end of the portable computer and an opening for exposing the docking connector and the locking unit during docking, so that the device may improve in design while the pin of the docking connector may be prevented from being bent.

2. Description of the Related Art

In order to enrich the function of a portable computer, a docking device has been used. The docking device is for expanding the function of a portable computer by mechanically and electrically connecting to the portable computer. It is important that peripheral devices be mounted on the portable computer promptly, easily, and versatilely.

A docking structure has been proposed in that a portable computer is dropped within a recess formed on a docking device (see Japanese Patent Publication No. 3197843, page 3 to 4, FIGS. 1 and 2, for example).

In this case, for setting the portable computer in a predetermined position of the docking device, the device is provided with the recess. Upon docking, the positioning is facilitated by dropping the portable computer into the recess.

Another docking structure has been disclosed in that the portable computer is mounted on a docking device along guide pins or ribs (see Japanese Unexamined Patent Application Publication No. 2001-306186, page 4 to 5, FIG. 5, for example).

FIG. 11 is a drawing of a structure of a docking device in related art having a plurality of guides. A docking device 10, as shown in FIG. 11, is provided with a plurality of projections 25 formed on a support surface 22A for placing a rear-end bottom surface (docking side) of a portable computer 12. Upon docking, the portable computer 12 is laterally positioned with these guides 25 and then, is pushed down to be docked by positionally fitting the portable computer 12 to an interface connector 24 for electrical connection.

A docking structure having an automatic locking mechanism has been proposed. FIG. 12 is a drawing of a docking device having an automatic locking mechanism in related art.

A docking device 30, as shown in FIG. 12, includes a docking connector 31, hooks 32a and 32b for fixing the back surface of a portable computer, hooks 33a and 33b for fixing the front side of the computer, a lever 34 for removing the computer, push-up pins 35a and 35b, and ground pins 36a and 36b. The hooks 33a and 33b have spring mechanisms.

In this case, when a battery is replaced in a docked state, if the docking connector comes off, an automatic locking mechanism has been used for preventing data from charging off due to the shutdown.

In this automatic locking mechanism, the hooks having spring mechanisms are inserted into locking holes formed on the bottom surface of the portable computer, so that the portable computer is fixed on a tray of the docking device.

However, in Japanese Patent Publication No. 3197843 mentioned above, although the positioning is facilitated, a problem has arisen in that a docking device body is increased in size.

In the case of the above Publication No. 2001-306186, since the support surface 22A is provided with a plurality of the projections 25 for guiding, there are problems of unrefined design and difficulties in positioning.

In the docking structure having the automatic locking mechanism mentioned above, the positioning is difficult and during docking, the portable computer is necessary to be pushed from the top for retaining the hooks having springs to the locking holes. Accordingly, a large force is applied to the connector so as to deform the connection pin.

Accordingly, it is desirable to provide a docking device and a docking structure for a portable computer capable of facilitating docking and improving in design as well as being capable of preventing a docking connector pin from bending.

In a docking device for a portable computer according to an embodiment of the present invention to be mechanically and electrically connected to the portable computer to expand the function of the portable computer, the docking device includes a tray for placing the rear end of the portable computer thereon; and a locking unit for locking the portable computer on the tray by manual operation, wherein the tray includes a claw member to be mated with an incised portion formed on the back surface of the portable computer, a bottom plate having a docking connector arranged thereon for electrically connecting to the portable computer, and a movable tray arranged on the bottom plate rotatably by a predetermined angle, the movable tray having two recesses equivalent in shape to legs formed at the rear end of the portable computer and an opening for exposing the docking connector and the locking unit during docking.

For example, the locking unit may include a slide locking switch and two hooks to be inserted into locking holes formed on the bottom surface of the portable computer in association with the slide locking switch operatively.

Also, the movable tray may include a spring mechanism, so that during non-docking, the movable tray is raised from the bottom plate by the spring mechanism so as to have a position not exposing the docking connector and the hooks on the surface, while during docking, the movable tray is pushed down by the portable computer so as to have a position being in contact with the surface of bottom plate.

A docking structure according to another embodiment of the present invention includes a portable computer; and a docking device for expanding the function of the portable computer thereon by mechanically and electrically connecting between the portable computer and the docking device, wherein the portable computer includes circular conical legs, an incised portion formed on the back face, and locking holes formed on the bottom surface, and wherein the docking device includes a tray for placing the rear end of the portable computer thereon and a locking unit for locking the portable computer on the tray, the tray having a claw member to be mated with the incised portion formed on the back face of the portable computer, a bottom plate having a docking connector arranged thereon for electrically connecting to the portable computer, and a movable tray arranged on the bottom plate rotatably by a predetermined angle, the movable tray having two recesses equivalent in shape to the legs formed at the rear end of the portable computer and an opening for exposing the docking connector and the locking unit during docking.

According to the present invention, the portable computer includes the circular conical legs, the incised portion formed on the back face, and the locking holes formed on the bottom surface. The docking device also includes the tray for placing the rear end of the portable computer thereon and the locking unit for locking the portable computer on the tray, in which the tray includes the claw member to be mated with the incised portion formed on the back face of the portable computer, the bottom plate having the docking connector arranged thereon for electrically connecting to the portable computer, and the movable tray arranged on the bottom plate rotatably by a predetermined angle. The movable tray includes the two recesses equivalent in shape to the legs formed at the rear end of the portable computer and the opening for exposing the docking connector and the locking unit during docking.

Thereby, during the docking, the positioning operation is structurally separated from the connecting operation. Furthermore, by providing the conical recesses for positioning, which are equivalent to the legs of the portable computer in shape, the displacement when the portable computer is placed during the docking may be automatically corrected, facilitating the docking between the portable computer and the docking device. During the non-docking, since the docking connector and so forth are not exposed on the surface of the movable tray, the device may improve in design.

Also, using the manually-operated locking unit, the operation intensely pushing the portable computer body for retaining the hooks with springs into the locking holes from the top may be eliminated, so that the pin of the docking connector may be prevented from being bent. By only sliding the slide locking switch of the locking unit to the unlock side so as to raise the portable computer, undocking may be easily made.

According to the present invention, the portable computer includes the circular conical legs, the incised portion formed on the back face, and the locking holes formed on the bottom surface. The docking device also includes the tray for placing the rear end of the portable computer thereon and the locking unit for locking the portable computer on the tray, in which the tray includes the claw member to be mated with the incised portion formed on the back face of the portable computer, the bottom plate having the docking connector arranged thereon for electrically connecting to the portable computer, and the movable tray arranged on the bottom plate rotatably by a predetermined angle. The movable tray includes the two recesses equivalent in shape to the legs formed at the rear end of the portable computer and the opening for exposing the docking connector and the locking unit during docking, so that the device may improve in design and the docking may be facilitated while the pin of the docking connector may be prevented from being bent.

BRIEF DESCRIPTION OF THE DRAWINGS

FIGS. 9A and 9B are side views of states of the portable computer 100 placed on the tray;

FIG. 10 is a drawing showing the removing operation of the portable computer 100;

DESCRIPTION OF THE PREFERRED EMBODIMENTS

A docking device and a docking structure for a portable computer according to an embodiment of the present invention will be described below with reference to the drawings.

Figure 1:
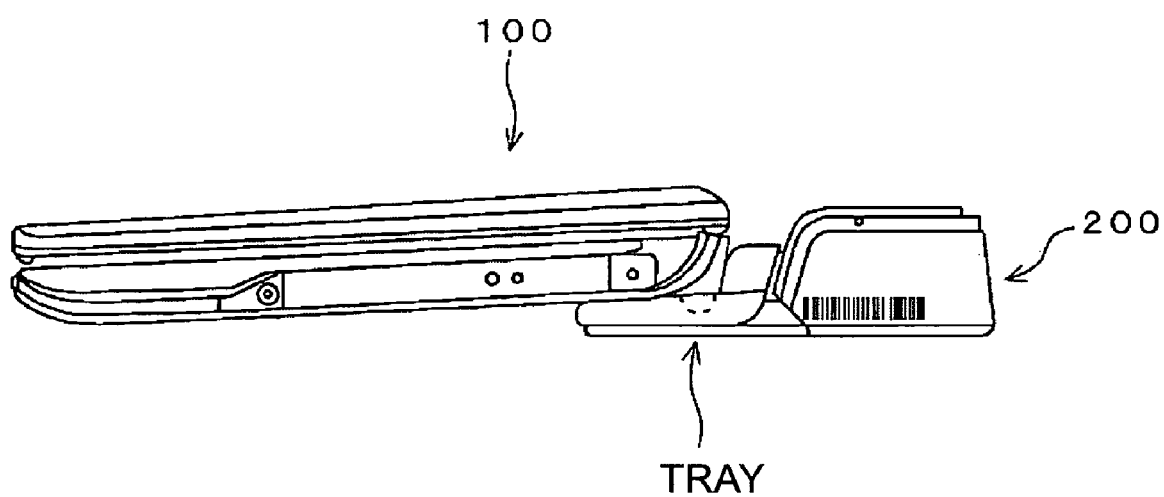
FIG. 1 is a drawing of a docking state between a portable computer 100 and a docking device 200 for a portable computer.

FIG. 1 is a drawing of a docking state between a portable computer 100 and a docking device 200 for a portable computer according to the embodiment of the present invention.

As shown in FIG. 1, when the portable computer 100 is docked to the docking device 200, the rear end of the bottom surface of the portable computer is placed on a tray of the docking device 200.

Figure 2A:
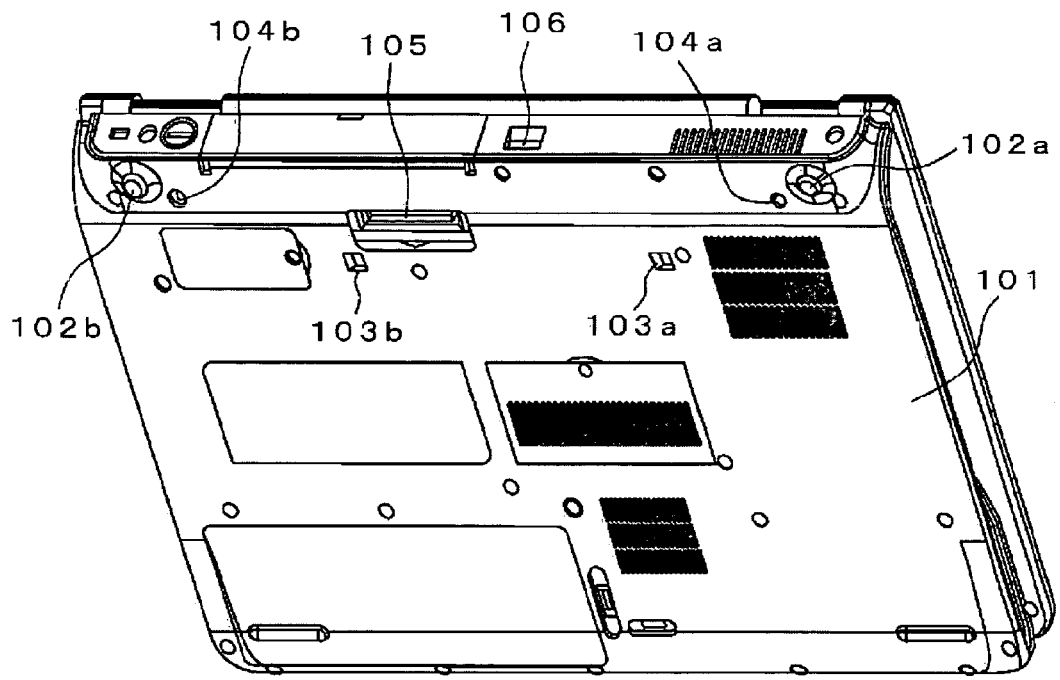
FIGS. 2A and 2B are drawings of the structure of the portable computer 100.
Figure 2B:
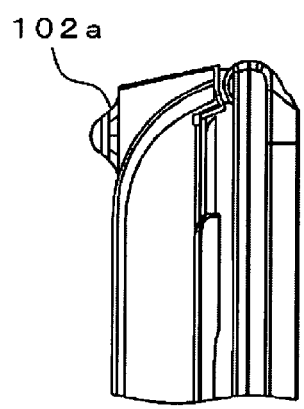

FIGS. 2A and 2B are drawings of the structure of the portable computer 100 according to the embodiment of the present invention. As shown in FIG. 2A, the bottom surface 101 of the portable computer 100 is provided with legs 102a and 102b, locking holes 103a and 103b, ground contacts 104a and 104b, and a docking connector 105. The back face (end face to be docked) of the portable computer 100 is provided with an incised portion 106. FIG. 2B is a side view of the leg of the portable computer 100. The legs 102a and 102b have circular conical shapes.

Figure 3:
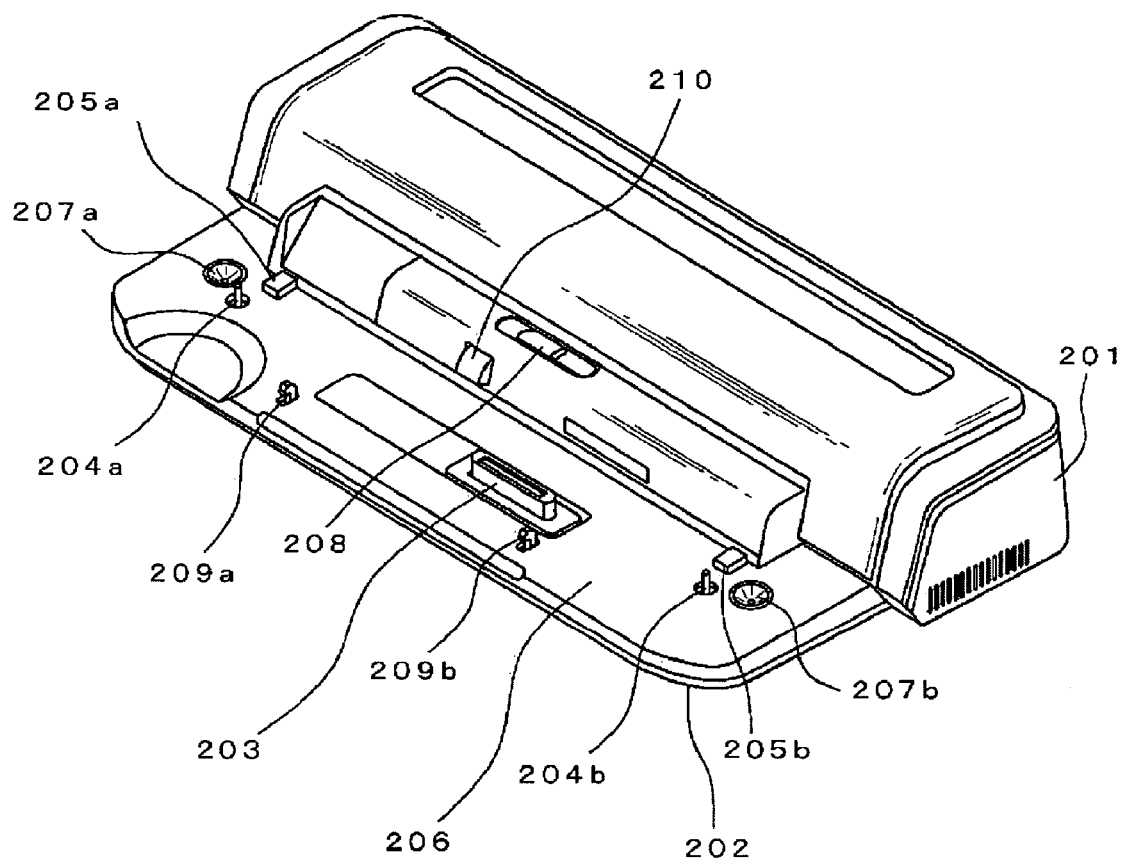
FIG. 3 is a drawing of the structure of the docking device 200 for a portable computer according to an embodiment.

FIG. 3 is a drawing of the structure of the docking device 200 for a portable computer according to the embodiment of the present invention. As shown in FIG. 3, the docking device 200 is composed of a docking device body 201, a bottom plate 202, a docking connector 203, ground pins 204a and 204b, projections 205a and 205b, a hop-up tray 206 as a movable tray, recesses 207a and 207b, a slide locking switch 208, hooks 209a and 209b, and a claw member 210.

In the docking device body 201, devices for expanding the function of the portable computer 100 are accommodated. The docking device body 201 is made integrally with the bottom plate 202 on which the hop-up tray 206 is provided.

The bottom plate 202 is also provided with the docking connector 203, the ground pins 204a and 204b, and the projections 205a and 205b.

The docking connector 203 is the same as a connector with guide pins for electrically connecting to the portable computer 100, and can be fitted with the docking connector 105 on the bottom surface 101 of the portable computer 100 for electrically connecting thereto. The ground of the portable computer 100 becomes the same level as that of the docking device 200 with the electrical contact between the ground pins 204a and 204b and the ground contacts 104a and 104b. The projections 205a and 205b support the portable computer 100 when the docking device 200 is undocked from the portable computer 100, and are provided with sheets resistant to friction covered on the surfaces. Providing the projections 205a and 205b prevents the hop-up tray 206 from being scuffed on the surface by the portable computer 100.

The hop-up tray 206 is provided with the recesses 207a and 207b to be dropped by the two conical legs formed at the rear end of the portable computer 100, respectively. The hop-up tray 206 is also provided with a plurality of openings formed for exposing the docking connector 203, the ground pins 204a and 204b, the projections 205a and 205b, and the hooks 209a and 209b on the surface when the portable computer 100 is docked.

FIG. 3 shows a state of the hop-up tray 206 pushed by the portable computer 100 and located at a position after the docking. In this case, the docking connector 203, the ground pins 204a and 204b, the projections 205a and 205b, and the hooks 209a and 209b are exposed on the surface of the hop-up tray 206.

The recesses 207a and 207b are the same as circular conical recesses to be dropped by the two legs 102a and 102b provided at the rear end of the portable computer 100, respectively. The shape of the respective recesses 207a and 207b is not limited to a circular cone, so that any shape may be applied as long as it can be fitted to the two legs 102a and 102b.

The slide locking switch 208 and the hooks 209a and 209b are functioning as locking units for fixing the portable computer 100 on a tray (i.e., the hop-up tray 206). The hooks 209a and 209b are drivingly connected to the slide locking switch 208.

The slide locking switch 208 has an operating knob for operating the hooks 209a and 209b, and when the operating knob is slid to the locking side, the portable computer 100 is fixed to the tray by inserting the hooks 209a and 209b into the locking holes 103a and 103b provided on the bottom surface of the portable computer 100. In addition, when the operating knob is slid to the un-locking side, the hooks 209a and 209b come off the locking holes 103a and 103b on the bottom surface of the portable computer 100 so as to raise the portable computer 100, so that it can be easily undocked from the docking device 200.

The claw member 210 is to be brought into engagement with the incised portion 106 on the back face (end face to be docked) of the portable computer 100, and has a function to press an end of the portable computer 100 during the docking. The claw member 210 has a spring mechanism so as to be pushed inside.

Figure 4:
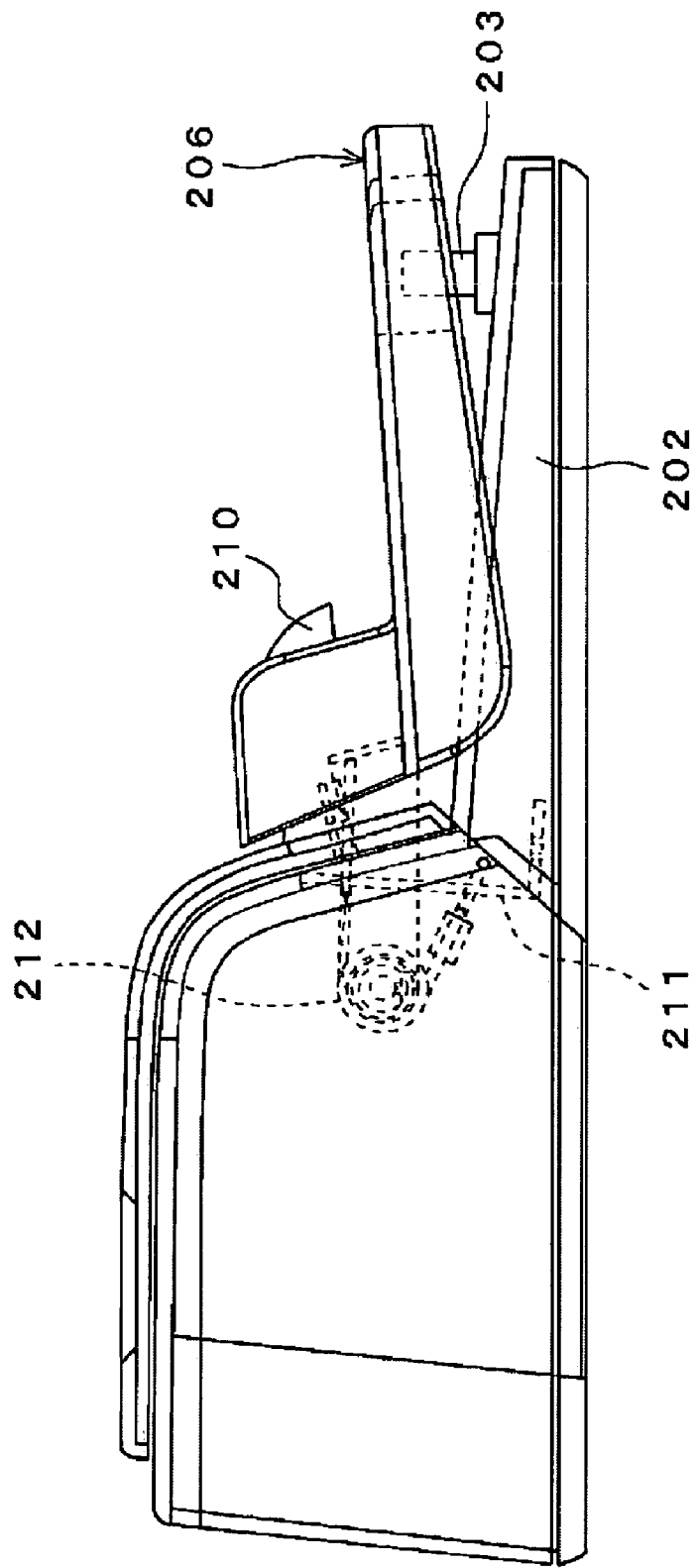
FIG. 4 is a side view of the structure of the docking device 200.

FIG. 4 is a side view of the structure of the docking device 200 showing a non-docking state of the docking device 200. The hop-up tray 206, as shown in FIG. 4, is supported by a tray support bracket 211 and is raised by a spring 212 during the non-docking state, showing the maximum angular position.

Figure 5A:
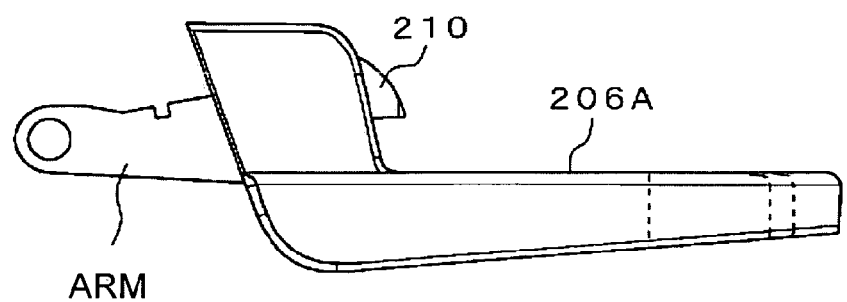
FIGS. 5A to 5C are drawings of associated parts of a hop-up tray 206.
Figure 5B:
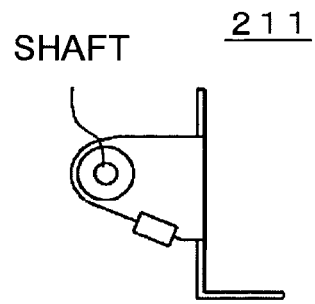
Figure 5C:
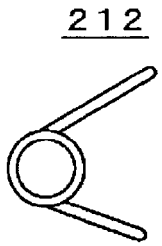

FIGS. 5A to 5C are drawings of associated parts of the hop-up tray 206: FIG. 5A shows a tray 206A having an arm for attaching the tray 206A to a rotational shaft; FIG. 5B shows an example of the tray support bracket 211; and FIG. 5C shows an example of the spring 212.

As shown in FIG. 4 mentioned above, during the non-docking state, the hop-up tray 206 is raised from the bottom plate 202 and is located at a position not exposing the docking connector 203 and so forth on the surface.

Since the docking connector 203, the ground pins 204a and 204b, the projections 205a and 205b, and the hooks 209a and 209b are not thereby exposed on the surface of the hop-up tray 206, the device improves in design.

Figure 6:
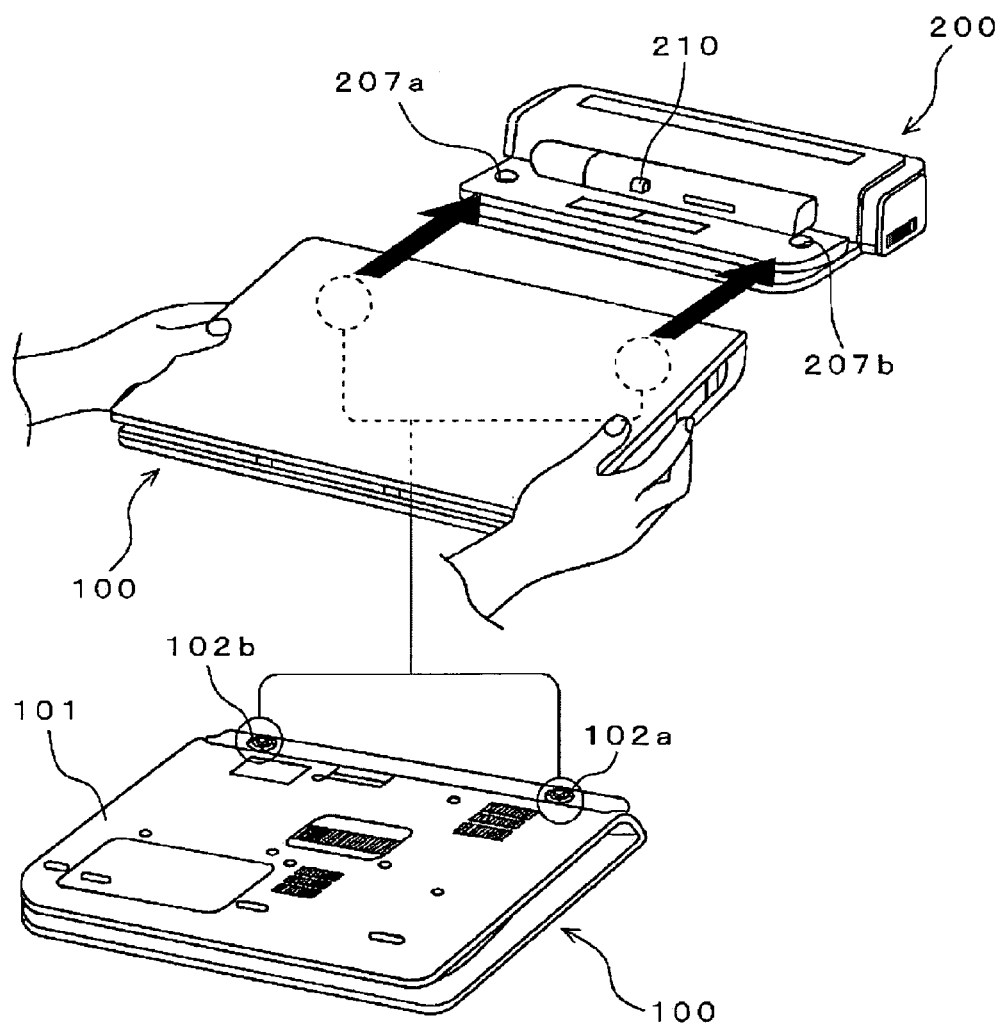
FIG. 6 is a perspective view of the portable computer 100 and the docking device 200 before the portable computer 100 is mounted.
Figure 7:
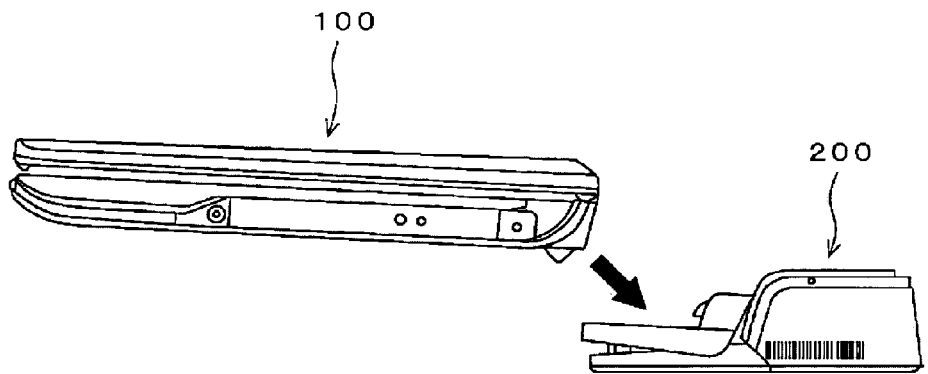
FIG. 7 is a side view of the portable computer 100 and the docking device 200 before the portable computer 100 is mounted.
Figure 8:
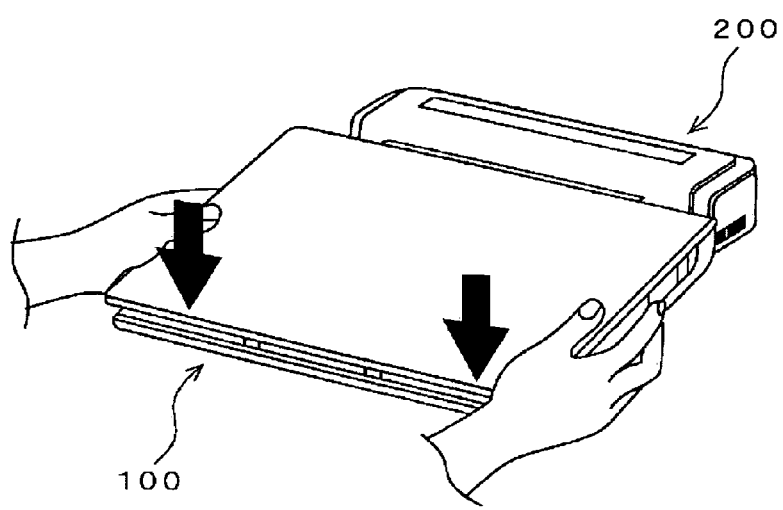
FIG. 8 is a perspective view of a state of the portable computer 100 placed on a tray.
Figure 11:
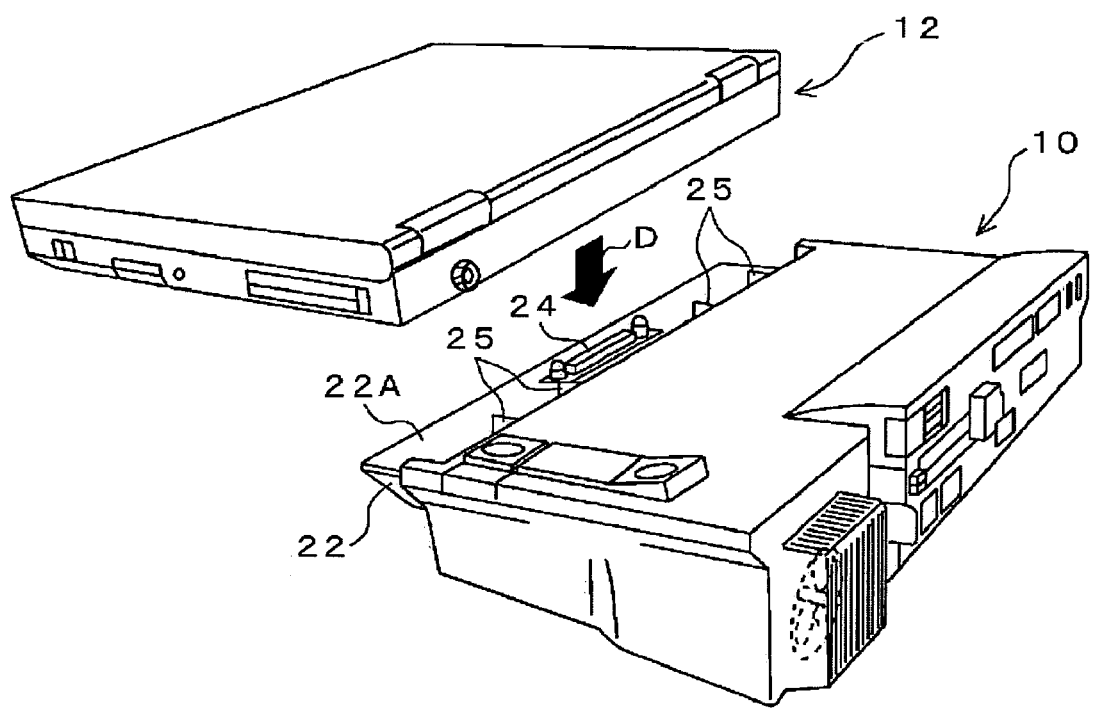
FIG. 11 is a drawing of a structure of a docking device in related art having a plurality of guides.
Figure 12:
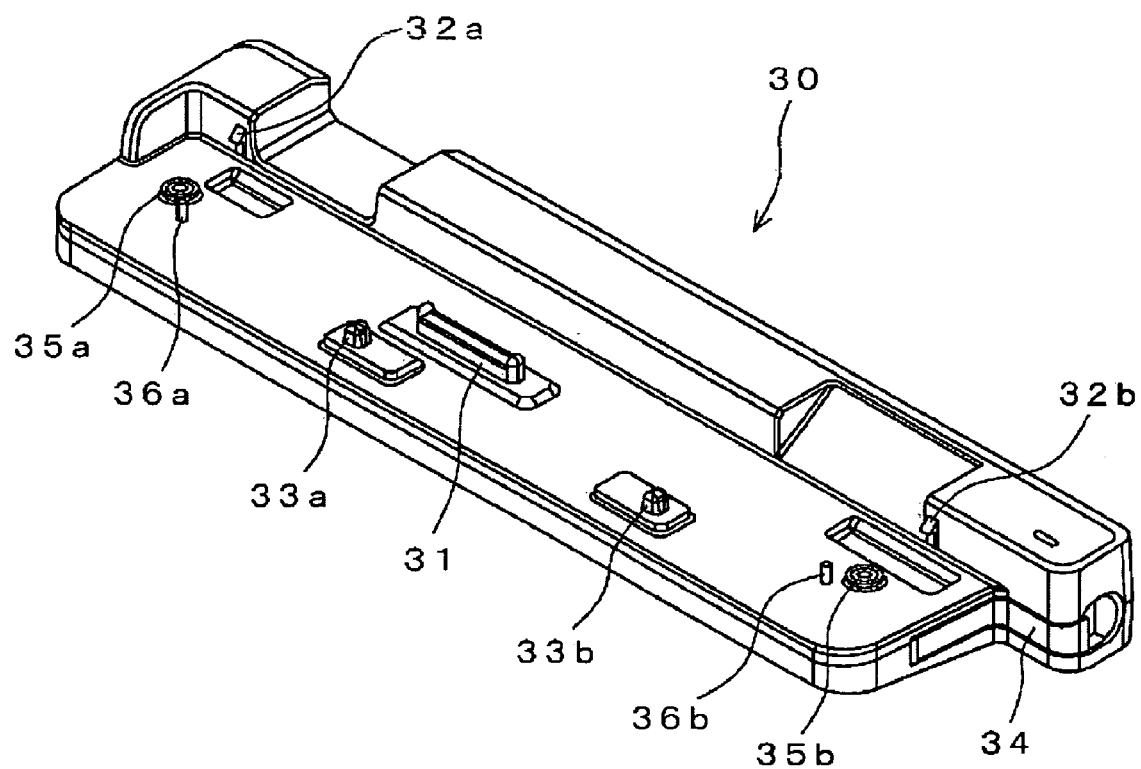
FIG. 12 is a drawing of a docking device having an automatic locking mechanism in related art.

The docking operation of the portable computer 100 into the docking device 200 will be described below with reference to FIGS. 6 to 9. FIG. 6 is a perspective view of the portable computer 100 and the docking device 200 before the portable computer 100 is mounted; FIG. 7 is a side view of them before being mounted; FIG. 8 is a perspective view of a state of the portable computer 100 placed on the tray; and FIGS. 9A and 9B are side views of states of the portable computer 100 placed on the tray.

Upon docking the portable computer 100 to the docking device 200, first, the operation knob of the slide locking switch 208 is slid to the unlocking side.

Then, as shown in FIGS. 6 and 7, the portable computer 100 is placed on the docking device 200. At this time, the positioning is made by inserting the legs 102a and 102b of the portable computer 100 into the recesses 207a and 207b of the hop-up tray 206, respectively. Simultaneously, the claw member 210 is automatically retained to the incised portion 106 on the back face of the portable computer 100. Then, as shown in FIGS. 8 to 9B, the front side of the portable computer 100 is calmly lowered down, thereby bringing the docking connector 105 into engagement with the docking connector 203.

Finally, the operating knob of the slide locking switch 208 is slid to the locking side so as to complete the docking.

When the portable computer 100 is mounted, as shown in FIG. 9B, the rear end of the bottom surface 101 of the portable computer 100 is placed on the tray while the hop-up tray 206 is pushed down onto the bottom plate 202 by the portable computer 100. At this time, the hooks 209a and 209b are inserted into the locking holes 103a and 103b formed on the bottom surface of the portable computer 100, respectively, while the docking connector 203 is brought into engagement with the docking connector 105 formed on the bottom surface of the portable computer 100.

When the portable computer 100 is removed from the docking device 200, the operating knob of the slide locking switch 208 is slid to the unlocking side.

Then, as shown in FIG. 10, the portable computer 100 is raised up from the front side, thereby separating the portable computer 100 from the docking device 200 by disconnecting the docking connector 203 from the portable computer 100.

As described above, according to the embodiment, the portable computer 100 has the legs 102a and 102b, the incised portion 106, and the locking holes 103a and 103b formed on the bottom surface. The docking device 200 also has the docking device body 201, the bottom-plate 202, the docking connector 203, the ground pins 204a and 204b, the projections 205a and 205b, the hop-up tray 206 as a movable tray, the recesses 207a and 207b, the slide locking switch 208, the hooks 209a and 209b, and the claw member 210. Upon docking, the positioning is made with the legs 102a and 102b of the portable computer 100 and the recesses 207a and 207b; then, the docking connector 105 is brought into engagement with the docking connector 203 by lowering the front side of the portable computer 100; finally, the locking is made with the slide locking switch 208.

Thereby, during the docking, the positioning operation is structurally separated from the connecting operation. Furthermore, by providing the conical recesses 207a and 207b for positioning, which are equivalent to the legs of the portable computer 100 in shape, the displacement when the portable computer 100 is placed during the docking is automatically corrected, facilitating the docking between the portable computer 100 and the docking device 200. During the non-docking, since the docking connector 203 and so forth are not exposed on the surface of the hop-up tray 206, the device improves in design.

Also, using the manually-operated slide locking switch 208, the operation intensely pushing the portable computer body for retaining the hooks with springs into the locking holes from the top is eliminated, so that the pin of the docking connector 203 is prevented from being bent. By only sliding the slide locking switch 208 to the unlock side so as to raise the portable computer 100, undocking is easily made.

In addition, according to the embodiment, as the locking unit, the slide locking switch 208 and the two hooks 209a and 209b for inserting into the recesses on the bottom surface of the portable computer 100 are used; however, the present invention is not limited to this, so that other manually-operated locking mechanism may be used.

It should be understood by those skilled in the art that various modifications, combinations, sub-combinations and alterations may occur depending on design requirements and other factors insofar as they are within the scope of the appended claims or the equivalents thereof.

What is claimed is:

1. A docking device for a portable computer to be mechanically and electrically connected to the portable computer to expand the function of the portable computer, the device comprising:
   a tray for placing a rear end of the portable computer thereon; and
   locking means for locking the portable computer on the tray by manual operation,
   wherein the tray includes
      a claw member to be mated with an incised portion formed on a back face of the portable computer,
      a bottom plate having a docking connector arranged thereon for electrically connecting to the portable computer, and
      a movable tray arranged on the bottom plate rotatably about an axis by a predetermined angle, the movable tray having two recesses equivalent in shape to legs formed at the rear end of the portable computer and an opening for exposing the docking connector and the locking means during docking, said axis being disposed adjacent said rear end of said portable computer such that a fore end of said portable computer rotatably forces said movable tray to pivot about said axis when said fore end of said portable computer is lowered on said movable tray during a docking operation.

2. The device according to claim 1, wherein the locking means includes a slide locking switch and two hooks to be inserted into locking holes formed on the bottom surface of the portable computer in association with the slide locking switch operatively.

3. The device according to claim 2, wherein the movable tray includes a spring mechanism, so that during non-docking, the movable tray is raised from the bottom plate by the spring mechanism so as to have a position not exposing the docking connector and the hooks on the surface, while during docking, the movable tray is pushed down by the portable computer so as to have a position being in contact with the surface of bottom plate.

4. The device according to claim 1, wherein the recesses have a circular conical shape.

5. A docking structure comprising:
   a portable computer; and
   a docking device for expanding the function of the portable computer, the docking device docking the portable computer thereon by mechanically and electrically connecting between the portable computer and the docking device,
   wherein the portable computer includes circular conical legs, an incised portion formed on a back face, and locking holes formed on the bottom surface, and wherein the docking device includes a tray for placing a rear end of the portable computer thereon and locking means for locking the portable computer on the tray, the tray having a claw member to be mated with the incised portion formed on the back face of the portable computer, a bottom plate having a docking connector arranged thereon for electrically connecting to the portable computer, and a movable tray arranged on the bottom plate rotatably about an axis by a predetermined angle, the movable tray having two recesses equivalent in shape to the legs formed at the rear end of the portable computer and an opening for exposing the docking connector and the locking means during docking, said axis being disposed adjacent said rear end of said portable computer such that a fore end of said portable computer rotatably forces said movable tray to pivot about said axis when said fore end of said portable computer is lowered on said movable tray during a docking operation.

6. A docking device for a portable computer to be mechanically and electrically connected to the portable computer to expand the function of the portable computer, the device comprising:
   a tray for placing a rear end of the portable computer thereon; and
   a locking unit for locking the portable computer on the tray by manual operation,
   wherein the tray includes a claw member to be mated with an incised portion formed on a back face of the portable computer, a bottom plate having a docking connector arranged thereon for electrically connecting to the portable computer, and a movable tray arranged on the bottom plate rotatably about an axis by a predetermined angle, the movable tray having two recesses equivalent in shape to legs formed at the rear end of the portable computer and an opening for exposing the docking connector and the locking unit during docking, said axis being disposed adjacent said rear end of said portable computer such that a fore end of said portable computer rotatably forces said movable tray to pivot about said axis when said fore end of said portable computer is lowered on said movable tray during a docking operation.

7. A docking structure comprising:
   a portable computer; and
   a docking device for expanding the function of the portable computer, the docking device docking the portable computer thereon by mechanically and electrically connecting between the portable computer and the docking device, wherein the portable computer includes circular conical legs, an incised portion formed on a back face, and locking holes formed on the bottom surface, and wherein the docking device includes a tray for placing a rear end of the portable computer thereon and a locking unit for locking the portable computer on the tray, the tray having a claw member to be mated with the incised portion formed on the back face of the portable computer, a bottom plate having a docking connector arranged thereon for electrically connecting to the portable computer, and a movable tray arranged on the bottom plate rotatably about an axis by a predetermined angle, the movable tray having two recesses equivalent in shape to the legs formed at the rear end of the portable computer and an opening for exposing the docking connector and the locking unit during docking, said axis being disposed adjacent said rear end of said portable computer such that a fore end of said portable computer rotatably forces said movable tray to pivot about said axis when said fore end of said portable computer is lowered on said movable tray during a docking operation.

* * * * *

UNITED STATES PATENT AND TRADEMARK OFFICE
CERTIFICATE OF CORRECTION

| | | |
|---|---|---|
| PATENT NO. | : 7,359,185 B2 | Page 1 of 1 |
| APPLICATION NO. | : 11/124546 | |
| DATED | : April 15, 2008 | |
| INVENTOR(S) | : Koichi Hiroyoshi | |

It is certified that error appears in the above-identified patent and that said Letters Patent is hereby corrected as shown below:

Column 2, between lines 14 and 15, insert

--SUMMARY OF THE INVENTION--

Signed and Sealed this

Eighteenth Day of November, 2008

JON W. DUDAS
*Director of the United States Patent and Trademark Office*